(12) United States Patent
Miyasu et al.

(10) Patent No.: US 7,545,087 B2
(45) Date of Patent: Jun. 9, 2009

(54) LIGHT SOURCE DEVICE WITH COOLING RIB

(75) Inventors: Katsuoki Miyasu, Himeji (JP); Takehiko Iguchi, Himeji (JP); Shunichi Morimoto, Himeji (JP)

(73) Assignee: Ushiodenki Kabushiki Kaisha, Tokyo (JP)

(*) Notice: Subject to any disclaimer, the term of this patent is extended or adjusted under 35 U.S.C. 154(b) by 257 days.

(21) Appl. No.: 11/457,179

(22) Filed: Jul. 13, 2006

(65) Prior Publication Data

US 2007/0013281 A1   Jan. 18, 2007

(30) Foreign Application Priority Data

Jul. 13, 2005   (JP) ............................... 2005-204288

(51) Int. Cl.
*H01J 61/52* (2006.01)
*H01J 1/02* (2006.01)
*H01J 7/24* (2006.01)
*H01K 1/58* (2006.01)

(52) U.S. Cl. .............................. 313/24; 313/11; 313/12; 313/23; 313/42; 313/113

(58) Field of Classification Search ............... 313/11, 313/12, 24, 28, 40, 42, 45, 46, 113
See application file for complete search history.

(56) References Cited

U.S. PATENT DOCUMENTS 5,903,088 A * 5/1999 Sugitani et al. ............... 313/46

FOREIGN PATENT DOCUMENTS

| JP | 2532712 Y2 | 1/1997 |
| JP | 2003-132845 A | 5/2003 |

* cited by examiner

*Primary Examiner*—Toan Ton
*Assistant Examiner*—Kevin Quarterman
(74) *Attorney, Agent, or Firm*—David S. Safran; Roberts Mlotkowski Safran & Cole, P.C.

(57) ABSTRACT

To devise a small light source device in which breaking of the bulb of the light source lamp can be suppressed and in which breaking of the bulb will not damage the window component, a light source lamp supported in a housing by only one of two hermetically sealed tubes at opposite ends of an arc tube, a cooling rib is mounted on a lead pin in the one of the sealed tubes that faces toward the window component and has a larger dimension in the radial direction than the maximum diameter of the opening edge of the light exit opening in the housing. The cooling rib serves to block bulb fragments and should it contact the peripheral edge area of the light exit opening with its edge that faces the window component, due to its size, neither the lead pin nor the cooling rib will contact the window component.

6 Claims, 2 Drawing Sheets

US 7,545,087 B2

LIGHT SOURCE DEVICE WITH COOLING RIB

BACKGROUND OF THE INVENTION

1. Field of the Invention

The invention relates to a light source device which is installed and used in a projection device, such as, for example, a projector device of the projection type or the like.

2. Description of the Prior Art

Currently, a type of light source device which is installed in a projection device, such as, for example, a projector device of the projection type or the like, as is shown, for example, in FIG. 5, has an essentially box-shaped housing 61 which is provided with a light exit opening 62, and a light source lamp 70 which is located in this housing 61. The light emitted from this light source lamp 70 is focused by means of a concave reflector 80 and is projected via the light exit opening 62. In order to increase the efficiency of the light from the light source lamp 70, there is, for example, a spherical reflector 81 in front of the concave reflector 80 with respect to the light exit direction.

In this light source device 60, there is a transparent window component 65 so that the light exit opening 62 of the housing 61 is closed from the outside. This yields a state in which the inside of the housing 61 is hermetically sealed. Accordingly, in operation of the light source lamp 70, the light source Tamp 70 and the two reflectors 80, 81, reach an extremely high temperature. Therefore, an arrangement is undertaken in which the light source lamp 70 and the two reflectors 80, 81, are cooled by, for example, cooling air being delivered into the housing 61 via an air inlet opening 63 for the cooling air supply which is formed in the housing 61. In FIG. 5, an evacuation opening 64 for evacuation of the cooling air is also shown.

For the light source lamp 70, a discharge lamp of the short arc type is used which has a bulb which, for example, has an arc tube 71 and hermetically sealed tubes 72A, 72B, which border the opposite ends of the arc tube 71, and in which an anode 75 and a cathode 76 disposed opposite each other in the arc tube 71. Additionally, the arc tube 71 is filled, for example, with xenon gas.

The anode 75 and the cathode 76 are each attached and held on the tip of a lead pin 77 that is made, for example, of a tungsten pin. The respective lead pin 77 extends into the hermetically sealed tubes 72A, 72B, along their tube axes to the outside. The base areas thereof project over the outer edges of the hermetically sealed tubes 72A, 72B. On the outer ends of the hermetically sealed tubes 72A, 72B, the hermetically sealed tubes 72A, 72B are sealed on the lead pins 77, for example, by graded glass, by which hermetically sealed parts are formed.

In this light source lamp 70, a base 79 is installed in the hermetically sealed tube which is located behind the light exit opening, specifically in the cathode-side hermetically sealed tube 72B. This base 79 is supported in the housing 61 by a holding component 66.

In recent years, there has been a tendency to carry a projection device, in which such a light source device has been installed, back and forth and to use it at different locations. Therefore, there is a need to reduce the size of the projection device, and with respect to the need, it is necessary, for example, to reduce the size of the light source device.

One means for reducing the size of the light source device was, for example, to make the light source lamp inherently smaller. In the case of an arrangement in which simply the light source lamp is made small, in operation of the light source lamp 70, the distance between the base area of the anode 75 and the region of the hermetically sealed tube 72A, which region is hermetically sealed, for example, by graded glass on the lead pin 77, becomes small, by which the anode 75 which reaches an extremely high temperature during operation of the light source lamp 79 approaches the hermetically sealed part. Therefore, the disadvantage arises that the hermetically sealed part reaches a high temperature, and thus, the bulb tends to become damaged.

Against this disadvantage, there is a measure which is described in Japanese utility model JP 2532712 Y2. Here, a cooling rib is placed, for example, on the lead pin which extends projecting to the outside from the hermetically sealed part to prevent the temperature of the hermetically sealed part of the light source lamp from rising. This cools the lead pin.

Another measure is disclosed in commonly owned Japanese patent application JP 2003-132845 A. Here, for example, in the periphery of the lead pin, proceeding from the outer peripheral area of the lead pin, there are several air guide plates arranged in the radial direction at distances relative to one another such that they extend in the axial direction. In the gaps between the lead pin and the air guide plates, cooling air can flow and thus cools the lead pin.

In the above described technology, the effect of cooling of the lead pin can be adequately obtained. However, it was found that the following disadvantage arises in both cases:

In the light source lamp, there are specifically cases in which the bulb breaks during operation, since the internal pressure in the arc tube during operation becomes extremely high. In the light source device 60 with the above described arrangement, since only one of the hermetically sealed tubes of the light source lamp 70, i.e., only the hermetically sealed tube 72B, is supported (unilateral support arrangement), there are cases in which the window component 65 is damaged by the fragments of the bulb flying around and colliding with the window component 65. In particular, when the window component is damaged in the state in which the light source device is installed in the projector device, adverse effects are exerted on the devices in the peripheral vicinity of the projector device.

SUMMARY OF THE INVENTION

The invention was devised to eliminate the above described disadvantage in the prior art. Thus, a primary object of the present invention is to devise a small light source device in which breaking of the bulb of the light source lamps can be suppressed, and in which, even in the case of breaking of the bulb, the window component located in the housing is prevented from being damaged.

The above object is achieved as in accordance with the invention in a light source device which comprises the following:

a housing in which the light exit opening is formed;
a light source lamp which is located in the housing;
reflectors which are located in the housing and project the light emitted from the light source lamp onto the light exit opening; and
a transparent window component is arranged to close the light exit opening of the housing from the outside; and
a feed of cooling air for light source lamp and the reflectors is fed into the housing during operation of the lamp, by the light source lamp having a bulb which has an arc tube in which there is an opposed pair of electrodes, and hermetically sealed tubes which are connected to opposite ends of the arc tube and extend to the outside, lead pins electrically connected to the electrodes projecting outward from the outer ends of the hermetically sealed tubes, the light source lamp being located in a position in which only the hermetically sealed tube facing away from the light exit direction is supported by the housing, and in which the tube axis of the bulb extends along the light exit direction, and a cooling rib being provided on the one of the lead pins which is positioned upstream of the light exit direction with a larger dimension in the radial direction than the maximum diameter of an opening edge of the light exit opening in the housing at the position at which, in the case of contact of the outer edge area of this cooling rib, is adjacent to the peripheral edge area of the light exit opening with the inside wall of the housing, neither the lead pin nor the cooling rib being in contact with the window component.

In this connection, the term "maximum diameter" means the diameter when the opening edge of the light exit opening is, for example, circular. When the opening edge of the light exit opening has other than a circular shape, such as, for example, the shape of a polygon, this means the maximum dimension in width when the opening edge between two parallels is spanned such that the distance between these parallels becomes maximum. If, for example, the opening edge of the light exit opening is square, the dimensions of the diagonals are meant.

The object of the invention is, furthermore, advantageously achieved in a light source device in that the cooling rib is formed such that several cooling air flow openings extend continuously in the direction of thickness.

The object of the invention is, moreover, advantageously achieved in a light source device in that the cooling rib is formed by two metal plates of different materials coming to rest on one another, one of the metal plates having a good heat conduction characteristic and the other metal plate having a good electrically conductive characteristic.

Action of the Invention

In the light source device in accordance with the invention, a cooling rib is generally installed on the lead pin which is located upstream of the light exit direction of the light source device in which only the hermetically sealed tube located away from the light exit direction is supported, and which lead pin projects from the outer end of the hermetically sealed tube. Therefore, during operation of the light source lamp, sufficient cooling action of the lead pin can be obtained and the hermetically sealed part can be prevented from reaching a high temperature. As a result, the bulb can be prevented from breaking and moreover the size of light source lamp can be reduced.

In addition there is the following action:

Even in the case in which the light source lamp breaks during operation and fragments of it fly around, the cooling rib acts as a stopper, in this way, the lamp fragments vigorously collide with this cooling rib that has a larger dimension in the radial direction than the maximum diameter of the opening edge of the light exit opening in the housing. Thus, it is possible to prevent the fragments of the light source lamp from vigorously colliding directly with the window component. In this way, the window component can be reliably prevented from being damaged.

Because several cooling air flow openings are formed in the cooling rib, each of which extend continuously in the direction of thickness, the contact surface with the cooling air can be enlarged, and therefore, the effect of cooling of the lead pin which is positioned in front of the air exit opening can be reliably obtained to a sufficient degree.

Furthermore, because the cooling rib is formed by two metal plates of different materials coming to rest on one another and by one of the metal plates having a good heat conduction characteristic and the other metal plate having a good electrically conductive characteristic, by the action of one of the metal plates, the heat of the lead pin which is positioned upstream in the light exit direction can be radiated with high efficiency, and therefore, it is possible to reliably prevent the hermetically sealed parts from reaching a high temperature. Moreover, power supply to the light source lamp can be advantageously carried out by the action of the other metal plate.

The invention is described below using several exemplary embodiments shown in the drawings.

DETAILED DESCRIPTION OF THE INVENTION

FIRST EMBODIMENT

Figure 1:
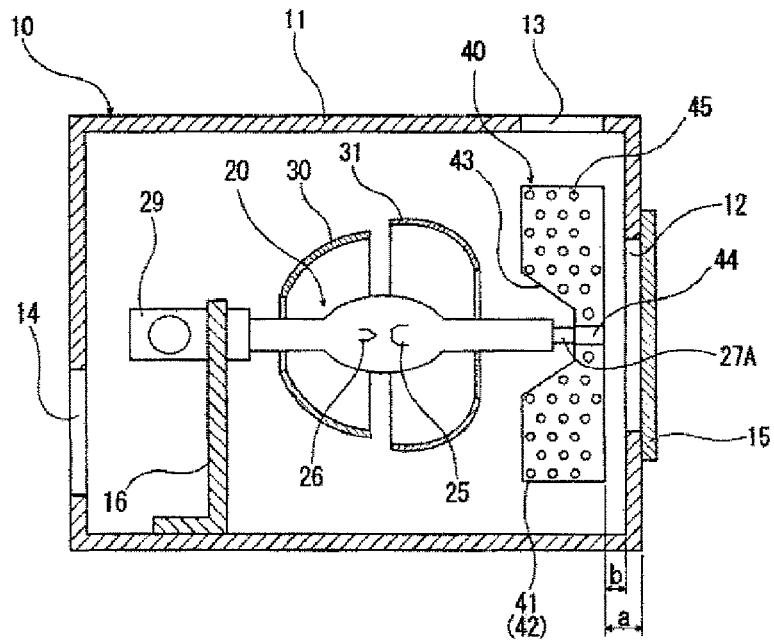
FIG. 1 is a schematic cross-sectional view of the arrangement of one example of the light source device in accordance with the invention.
Figure 2:
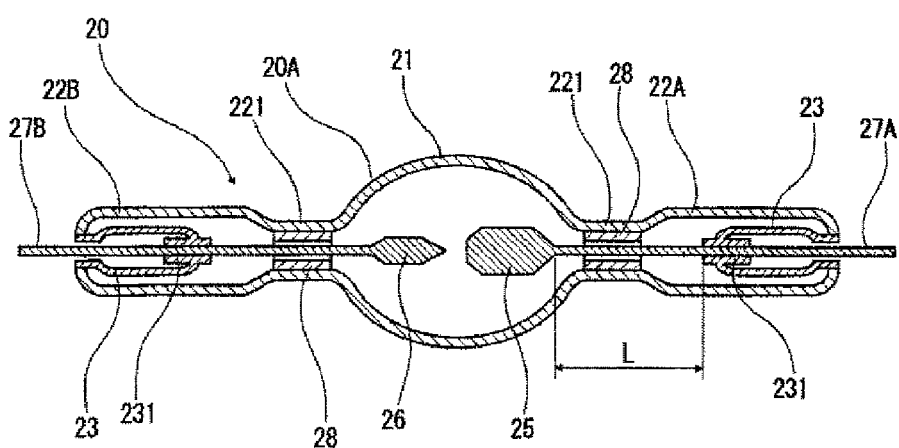
FIG. 2 is a schematic cross-sectional view of the arrangement of one example of the light source lamp for the light source device shown in FIG. 1.

FIG. 1 is a schematic cross section of the arrangement of one example of the light source device 10 in accordance with the invention and FIG. 2 is a schematic cross section of the arrangement of one example of the light source lamp 20 for the light source device shown in FIG. 1. The light source device 10 has an essentially box-shaped housing 1, for example, of aluminum, in which is formed a light exit opening 12 with, for example, a circular opening edge. In this housing 11, there are a light source lamp 20 and two reflectors 30, 31, which project the light emitted from the light source lamp 20 via the light exit opening 12. The shape of the opening edge of the light exit opening 12 is not limited to a circular shape.

In FIG. 1, there are an air inlet opening 13 for feed of cooling air into the housing 11 during operation of the light source lamp 20 and an evacuation opening 14 for evacuating the air which has been fed into the housing 11 back to the outside.

The housing 11 has a transparent window component 15 arranged such that the light exit opening 12 of the housing 11 is closed from the outside. In this way, a light exit window is formed. The material of the window component 15 can be, for example, borosilicate glass or the like.

The light source lamp 20 has a bulb 20A which has, for example, an oval arc tube 21 which forms an emission space, and hermetically sealed tubes 22A, 22B, which extend outward from opposite ends of the arc tube 21. In the arc tube 21, an anode 25 is located opposite a cathode 26, and moreover, the arc tube 21 is filled with an emission substance, such as a rare gas, e.g., xenon, argon, krypton or the like, or a filler gas of a mixture thereof, and if necessary, mercury and the like.

The anode 25 and the cathode 26 are each attached and held on the ends of the lead pins 27A, 27B, which are, for example, tungsten pins. Each of the lead pins 27A, 27B extend in the hermetically sealed tubes 22A, 22B along the tube axes thereof, such that their base areas project from the outer edges of the hermetically sealed tubes 22A, 22B.

The lead pins 27A, 27B are sealed in the outer ends of the hermetically sealed tubes 22A, 22B, by graded glass 23, by which hermetically sealed parts 231 are formed.

The shrunken area 221 shown in FIG. 2 is formed by the hermetically sealed tubes 22A, 22B being partially reduced in their diameter. A sleeve component 28 is located in the respective shrunken area 221 of the hermetically sealed tubes 22A, 22B and is fused to the shrunken area 221. The lead pins 27A, 27B are each inserted into the middle passage opening of this sleeve component 28.

This light source lamp 20 has a base 29 on the outer end of the cathode-side hermetically sealed tube 22B. Because this base 29 is held securely by a holding component 16 which is attached in the housing 11, the tube axis of the bulb 20A extends along the light exit direction, so that the anode 25 is positioned upstream of the light exit direction (to the right in FIG. 1).

For the light source device 10, a first reflector 30 formed, for example, of an oval focusing mirror has its first focal point aligned with the radiance spot which is formed between the anode 25 and the cathode 26 in the light source lamp 20. Moreover, the first reflector 30 is arranged such that the focal point of the second reflector 31, for example, a spherical mirror, that is located in front of the first reflector 30 with respect to the light exit direction of the light source device 10, also is aligned with the radiance spot.

By this arrangement, part of the light radiated by the light source lamp 20 is projected directly forward or is reflected by the first reflector 30 and projected forward. Moreover, the light directed forward from the outer edge of the first reflector 30 and to the outside is returned by the second reflector 31 to the arc area, and is focused by means of the first reflector 30 and projected forward.

In the above described light source device 10, on the lead pin which is positioned upstream in the light exit direction of the light source lamp 20, i.e., on the portion of the anode-side lead pin 27A which protrudes from the outer end of the hermetically sealed tube 22A, there is a cooling rib 40 that extends beyond the maximum diameter of the opening edge of the light exit opening 12 in the housing 11, specifically with a larger dimension in the radial direction (total length) than the diameter of the circular light exit opening 12.

Specifically, the cooling rib 40 is located in the position in which neither the outer edge area of this cooling rib 40 which is opposite the peripheral edge area of the light exit opening 12 nor the lead pin 27A is in contact with the window component 15. In this exemplary embodiment, for example, the minimum distance a between the outer edge area of the region which is opposite the light exit opening 12 of the cooling rib 40, and the inside of the window component 15 is greater than the minimum distance b between the outer edge area of the cooling rib 40 and the inside wall surface of the housing 11, and the anode-side lead pin 27A does not project outward beyond the outer edge of the cooling rib 40.

Figure 3:
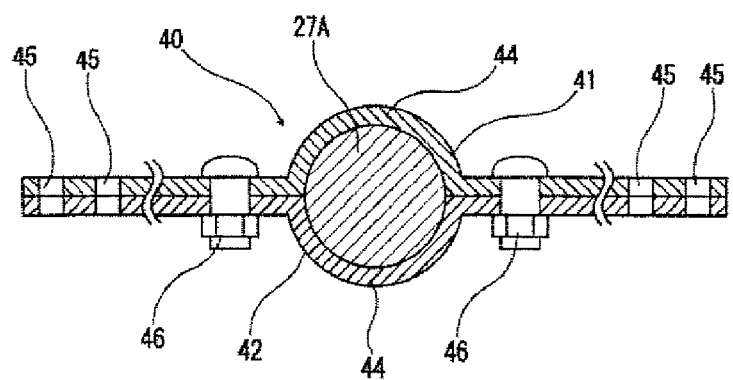
FIG. 3 is a schematic cross-sectional view of the arrangement of one example of the cooling rib.

The cooling rib 40, as is shown in FIG. 3, is formed by two metal plates of different materials coming to rest on one another, one of the metal plates, i.e., the metal plate 41, having a good electrically conductive characteristic and the other metal plate 42 having a good heat conduction characteristic. On the bottom end of metal plate 41, there is a tongue (not shown) to which a power supply line is connected. In this way, the metal plate 41 acts as a power supply component for the anode-side lead pin 27A.

The metal plates 41, 42 comprising the cooling rib 40 are each made altogether essentially rectangular except that their lengthwise (radial direction) middle area has a widthwise tapering gap 43 (see, FIG. 1) at a side which faces inward toward the lamp 20. Moreover, the middle areas of the plates 41, 42 have an arch 44 which is arc-shaped in opposite directions so that, together, they form a tubular area for receiving the anode-side lead pin 27A.

The metal plate 41 and the other metal plate 42 are attached by fastener components 46 with the anode-side lead pin 27A clamped by the respective arches 44.

The combination of two types of materials of the metal plates comprising the cooling rib 40, by way of example, can be a metal plate 41 made of copper (Cu) with a surface which has been galvanized, for example, with nickel. The other metal plate 42 can be made, for example, of aluminum (Al).

Several cooling air flow openings 45 are formed in the cooling rib 40 so as to penetrate the metal plates 41, 42, in the thickness direction. In this exemplary embodiment, the cooling air flow openings 45 are formed at given lattice points, for example, at zig-zag-lattice shaped points in the cooling rib 40 with the ratio of the total area of the opening area to the area of the cooling rib 40 being, for example at most 10%.

In this light source device 10, the cooling air supplied via the air inlet opening 13 of the housing 11 with respect to the surface of the other metal plate 42 for the cooling rib 40 is blown in at a given angle of, for example, 45°.

Whether, for example, the cooling rib 40 is inclined with respect to the air inlet opening 13 at a given angle or whether the air inlet opening 13 is provided with a suitable rectifier means for supply of cooling air to the cooling rib 40 with a given angle is irrelevant. Both arrangements are possible.

In the one above described example of the light source device 10, the housing 11 has a height of 150 mm, a width of 200 mm, a depth of 150 mm, an inside volume of 4500 cm$^3$ and a maximum diameter of the opening edge of the light exit opening 12 of 65 mm to 70 mm. The window component 15 has a diameter of 75 mm and a thickness of 3 mm. The light source lamp 20 has a rated lamp wattage of for example, 2 kW, a gas pressure during operation of at least 2 MPa, a total length of 193 mm and a distance L (FIG. 2) between the base area of the anode 25 and the hermetically sealed part 231 on the anode side of 30 mm. The metallic plates 41, 42 comprising the cooling rib 40 have a total length in the radial direction of 110 mm, a thickness of 1 mm, an area of 2500 mm$^2$, an opening diameter of the respective cooling air flow openings 45 of 3 mm, a number of cooling air flow openings 45 of 36 and a total area of the opening area of the cooling air flow openings 45 of 84 mm$^2$ (area ratio to the cooling rib 40 is 3.4%). The amount of cooling air supplied into the housing 11 is, for example, 2 m$^3$/minute.

The cooling rib 40 is installed directly in the light source device 10 with the above described arrangement, fundamentally in the region of the anode-side lead pin 27A, which region projects from the outer end of the hermetically sealed tube 22A, the light source lamp 20 being supported only at the cathode-side hermetically sealed tube 22B. Therefore, during operation of the light source lamp 20, a sufficient cooling action of the anode-side lead pin 27A can be obtained and the hermetically sealed parts 231 can be prevented from reaching a high temperature. As a result, the bulb 20A can be prevented from breaking. As a result, the size of light source lamp 20 can be reduced by the measure that, for example, the distance L between the base region of the anode 25 and the hermetically sealed part 231 is reduced or by similar measures. Specifically the distance L between the base area of the anode 25 and the hermetically sealed part 231 can be fixed, for example, at 30 mm or less.

Moreover, it can be obtained that, even in the case in which the bulb 20A in the light source lamp 20 breaks and fragments of it fly around, the cooling rib 40 acts as a stopper against which the fragments will collide instead of against the window component 15, and because it has a larger dimension in the radial direction than the maximum diameter of the opening edge of the light exit opening 12 in the housing 11, in the case of contact with an inside wall of the housing by an outer edge area of the cooling rib 40 which faces a peripheral edge area of the light exit opening 12, neither the cooling rib 40 nor the lead pin 27A on which it is mounted will contact with the window component 15. Thus, it is possible to prevent the fragments of the light source lamp 20 from directly colliding vigorously with the window component 15. In other words, the parts which experience the collisions with the fragments are the cooling rib and the housing part which surrounds the window component 15. In this way, the window component 15 can be reliably prevented from being damaged. Therefore, the light source device 10 with the above described arrangement has no adverse effects on devices in the peripheral vicinity due to damage of the window component 15. In the case of an arrangement, for example, of a small projector device, it becomes extremely useful.

Furthermore, because several cooling air flow openings 45 are formed in the cooling rib 40 and each extend continuously in the direction of thickness, the contact surface with the cooling air can be enlarged and therefore the effect of cooling of the anode-side lead pin 27A can be reliably obtained to a sufficient degree.

Furthermore, because the cooling rib 40 is formed by two metal plates of different materials, specifically an Al plate and a Cu plate, having come to rest on one another, mainly due to the action of the Al plate which forms the other metal plate 42 with a good heat conduction characteristic, the heat of the anode-side lead pin 27A can be radiated with high efficiency and thus it is possible to reliably prevent the hermetically sealed parts 231 from reaching a high temperature. Moreover, power supply to the light source lamp 20 via the cooling rib 40 can be advantageously carried out by the action of the Cu plate which forms the metal plate 41 with a good conductive characteristic.

SECOND EMBODIMENT

Figure 4:
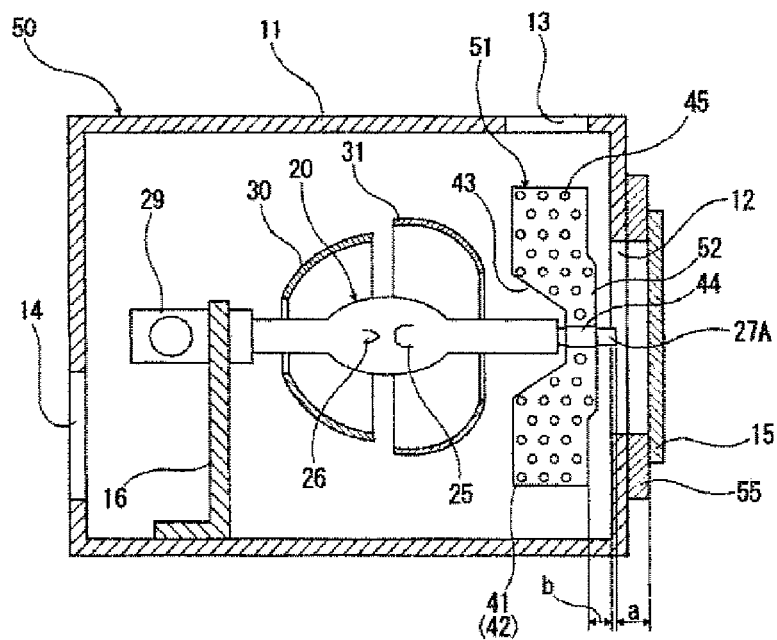
FIG. 4 is a schematic cross-sectional view of the arrangement of another example of the light source device in accordance with the invention.
Figure 5:
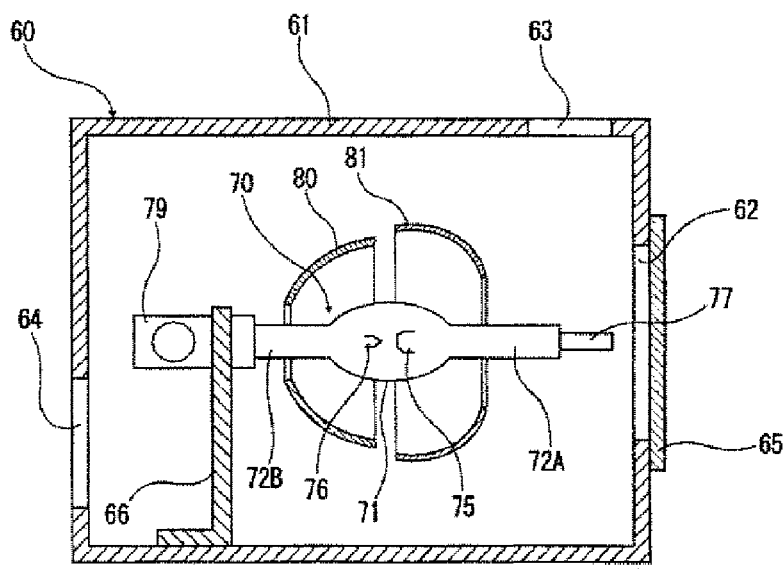
FIG. 5 is a schematic cross-sectional view of the arrangement of one example of a conventional light source device.

FIG. 4 is a schematic cross section of the arrangement of another example of the light source device in accordance with the invention. Besides the fact that, in the area in which there is a cooling rib 51 opposite the window component 15, the cooling rib of this light source device 50 has a projection (elevation) 52 which projects (forward) toward the outside, the same arrangement as the light source device shown in FIG. 1. The same components as the light source device shown in FIG. 1 are appropriately provided with the same reference numbers as in FIG. 1.

In this light source device 50, as in the light source device 10 shown in FIG. 1, the cooling rib 51 which located at a position at which, in the case of contact of the outer edge area of this cooling rib 51 which is opposite the peripheral edge area of the light exit opening 12 of the housing 11 with the inside wall surface of the housing 11, neither the lead pin 27A nor the projection 52 of the cooling rib 51 will contact with the window component 15. In this exemplary embodiment, for example, the minimum distance a between the tip of the anode-side lead pin 27A and the inside of the window component 15 is greater than the minimum distance b between the outer edge area of the cooling rib 51, except for the projection 52, and the inside wall surface of the housing 11.

In this light source device 50, for example, the anode-side lead pin 27A projects from the outer end of the cooling rib 51, yielding an arrangement in which the window component 15 is located on the housing 11 over a, for example, disk-like spacer 55 in which an opening is formed which corresponds to the light exit opening 12 of the housing 11. However, the above described state can be implemented using an arrangement like that of the light source device 10 shown in FIG. 1 in which the window component 15 is located directly on the housing 11.

In this way, since the housing 11 and the cooling rib 51 must be electrically insulated from one another, it is necessary for the cooling rib 51 to be spaced a sufficient distance from the housing 11.

By the light source device 50 with this arrangement, however, the cooling rib 51 can be arranged in the state in which at least part of the projection 52 extends at its outer end into the space of the light exit opening 12 of the housing 11. Therefore, using a cooling rib 51 with a sufficient heat radiation area (contact area with the cooling air), an arrangement with a relatively guaranteed electrical insulation property of the housing 11 and of the cooling rib 51 from one another can be undertaken. Therefore, basically the same action as in the light source device 10 with the arrangement shown in FIG. 1 can be obtained. Furthermore, because the housing 11, specifically the dimension of width of the housing 11 (dimension in the light exit opening) can be reduced by roughly 1.5% as compared to the light source device shown in FIG. 1, the entire light source device 50 can be made even smaller.

Embodiments of the invention were described above. However, the invention is not limited to the above described embodiments, and various changes can be made. For example, the shape of the cooling rib is not specially limited to those mentioned so long as the total length in the radial direction is greater than the maximum diameter of the opening edge of the light exit opening in the housing.

Furthermore, the number of cooling air flow openings, the pattern of the positions at which they are formed, and the size of the opening diameter are not specially limited, but can be suitably changed depending on the purpose.

Furthermore, the invention is not limited to a light source device with a light source lamp in which the hermetically sealed arrangement is produced by graded glass, but the invention can be used for a light source device with a light source lamp in which, for example, a hermetically sealed arrangement can be produced by an inner lead pin which supports an anode or a cathode on the tip being connected to an outer lead pin via a metal foil which is hermetically installed in the hermetically sealed part.

What we claim is:

1. Light source device, comprising:
   a housing in which a light exit opening is formed;
   a light source lamp which is located in said housing;
   reflectors which are located in said housing and which are positioned to project light emitted from the light source lamp out of the housing via the light exit opening; and
   a transparent window component which is arranged to close the light exit opening relative to the exterior of the housing; and
   means for directing a flow of cooling air for cooling the light source lamp and the reflectors through the housing;
   wherein the light source lamp has a bulb with an arc tube in which there is a pair of opposed electrodes, and which has hermetically sealed tubes extending from opposite ends of the arc tube, lead pins being electrically connected to the electrodes and projecting from outer ends of the hermetically sealed tubes, wherein only a one of the hermetically sealed tubes located away from the light exit direction is supported by the housing with a tube axis of the bulb extending in the light exit direction, wherein a cooling rib is provided on a one of the lead pins which is directed toward the light exit opening, the cooling rib having a larger dimension in a radial direction than a maximum diameter of an outer edge of the light exit opening in the housing, and wherein the minimum distance between an outer edge area of the cooling rib in a region thereof which is faces the light exit opening and the inside of the window component is greater than the minimum distance between the outer edge area of the cooling rib and the inside surface of the housing such that, in the case of contact with an inside wall of the housing by an outer edge area of the cooling rib which faces a peripheral edge area of the light exit opening, neither the cooling rib nor the lead pin on which it is mounted will contact with the window component.

2. Light source device according to claim 1, wherein the cooling rib is formed with a plurality of cooling air flow openings extending continuously through it in a thickness direction.

3. Light source device as claimed in claim 2, wherein the cooling rib is formed by metal plates of different materials coming to rest on one another, a first of the metal plates having a good heat conduction characteristic and a second of the metal plates having a good electrical conductivity characteristic.

4. Light source device, comprising:
a housing in which a light exit opening is formed;
a light source lamp which is located in said housing;
reflectors which are located in said housing and which are positioned to project light emitted from the light source lamp out of the housing via the light exit opening; and
a transparent window component which is arranged to close the light exit opening relative to the exterior of the housing; and
means for directing a flow of cooling air for cooling the light source lamp and the reflectors through the housing;

wherein the light source lamp has a bulb with an arc tube in which there is a pair of opposed electrodes, and which has hermetically sealed tubes extending from opposite ends of the arc tube, lead pins being electrically connected to the electrodes and projecting from outer ends of the hermetically sealed tubes, wherein only a one of the hermetically sealed tubes located away from the light exit direction is supported by the housing with a tube axis of the bulb extending in the light exit direction, wherein a cooling rib is provided on a one of the lead pins which is directed toward the light exit opening, the cooling rib having a larger dimension in a radial direction than a maximum diameter of an opening edge of the light exit opening in the housing such that, in the case of contact with an inside wail of the housing by an outer edge area of the cooling rib which faces a peripheral edge area of the light exit opening, neither the cooling rib nor the lead pin on which it is mounted will contact with the window component, and wherein the cooling rib is formed by metal plates of different materials coming to rest on one another, a first of the metal plates having a good heat conduction characteristic and a second of the metal plates having a good electrical conductivity characteristic.

5. Light source device according to claim 1, wherein the one of the lead pins on which the cooling rib is provided does not project outward beyond the outer edge area of the cooling rib.

6. Light source device according to claim 1, wherein the one of the lead pins on which the cooling rib is provided does projects outward beyond the outer edge area of the cooling rib, the minimum distance between the tip of said one of the lead pins and the inside of the window component being greater than the minimum distance between the outer edge area of the cooling rib and the inside wall surface of the housing.

* * * * *